Figure 1:
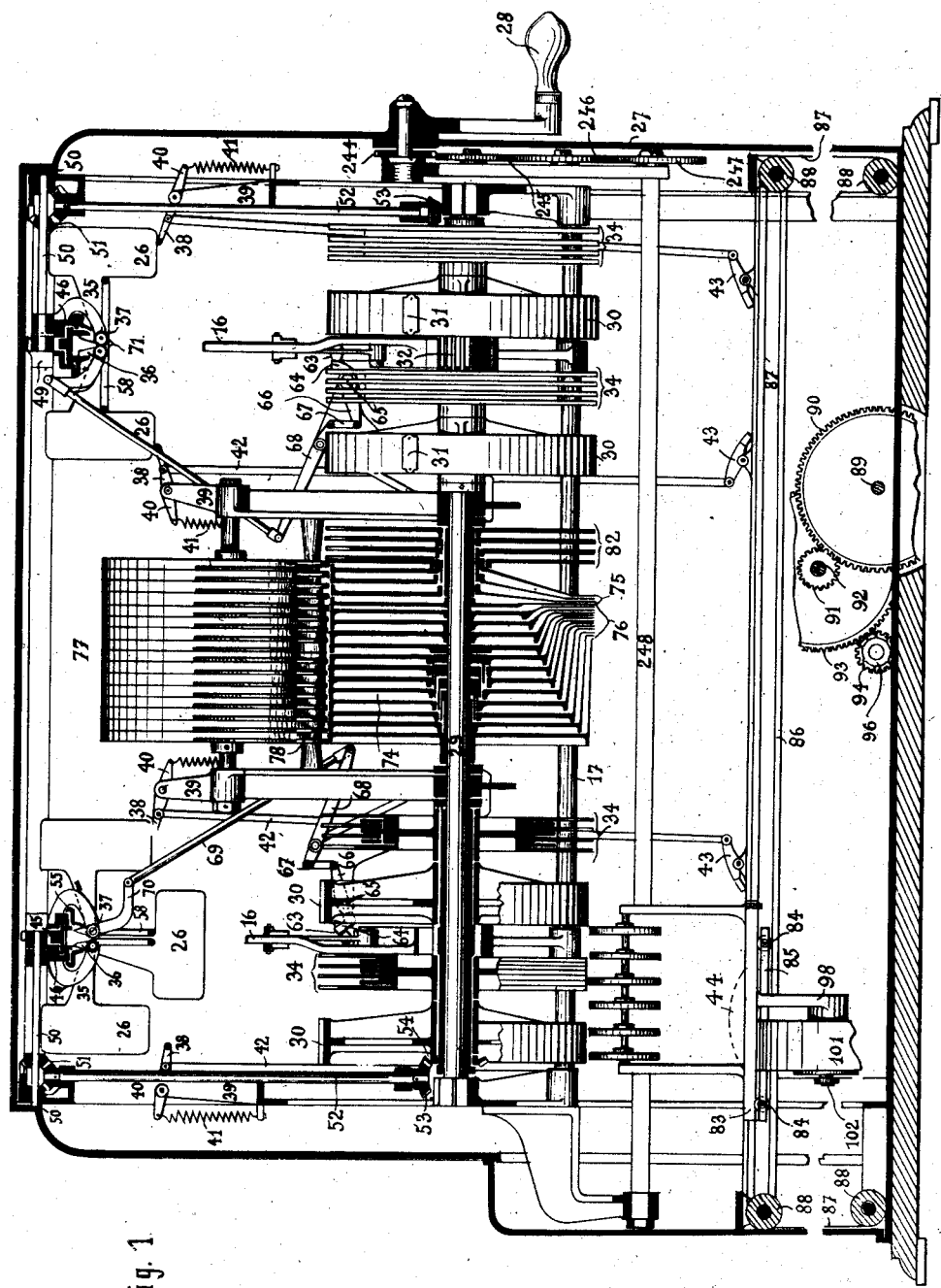

No. 814,985. PATENTED MAR. 13, 1906.
R. T. PISCICELLI.
MACHINE FOR PRINTING AND ISSUING RAILWAY TICKETS.
APPLICATION FILED JULY 6, 1903.

12 SHEETS—SHEET 1.

WITNESSES
H. M. Avery
A. C. Davis

INVENTOR
Roberto Taegge Piscicelli
BY
Munn
ATTORNEYS

No. 814,985. PATENTED MAR. 13, 1906.
R. T. PISCICELLI.
MACHINE FOR PRINTING AND ISSUING RAILWAY TICKETS.
APPLICATION FILED JULY 6, 1903.

12 SHEETS—SHEET 2.

WITNESSES:

INVENTOR
Roberto Tueggi Piscicelli
BY
ATTORNEYS

No. 814,985. PATENTED MAR. 13, 1906.
R. T. PISCICELLI.
MACHINE FOR PRINTING AND ISSUING RAILWAY TICKETS.
APPLICATION FILED JULY 6, 1903.

12 SHEETS—SHEET 3.

WITNESSES:
W. M. Avery
A. H. Davis

INVENTOR
Roberto Taeggi Piscicelli
BY
[signature]
ATTORNEYS

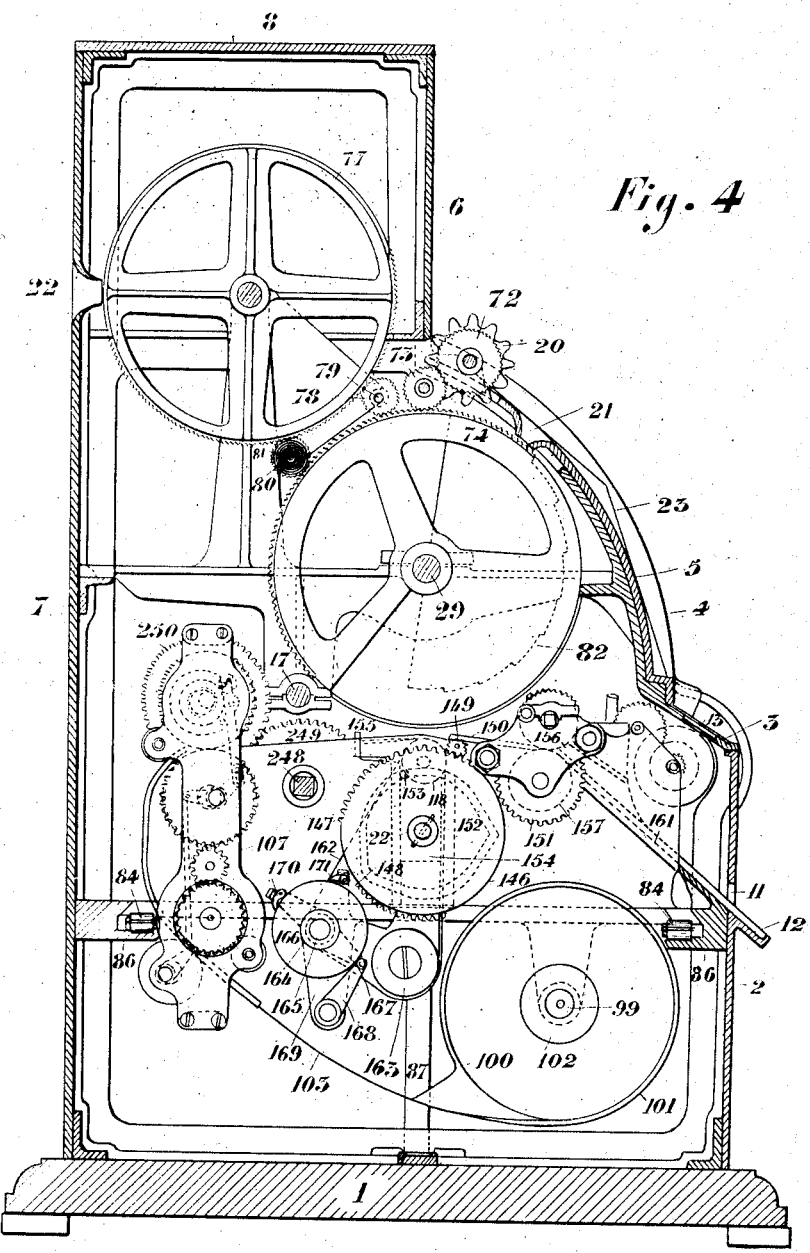

No. 814,985. PATENTED MAR. 13, 1906.
R. T. PISCICELLI.
MACHINE FOR PRINTING AND ISSUING RAILWAY TICKETS.
APPLICATION FILED JULY 6, 1903.
12 SHEETS—SHEET 5.
Fig. 7
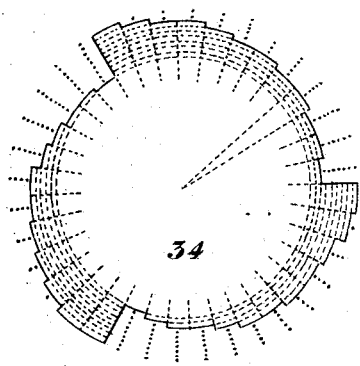
Fig. 5
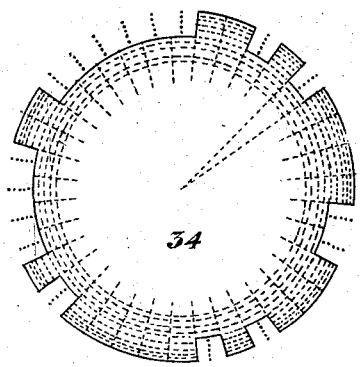
Fig. 8
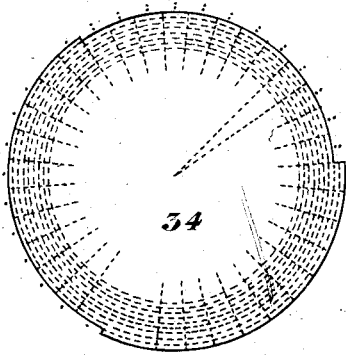
Fig. 6
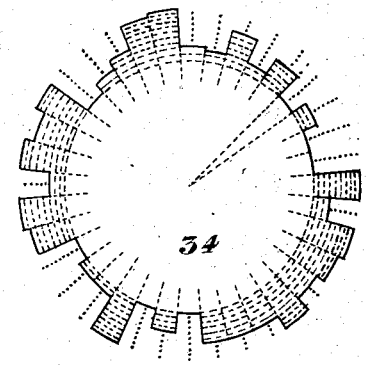
Fig. 9
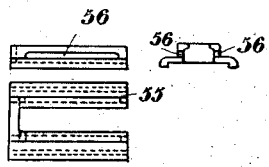
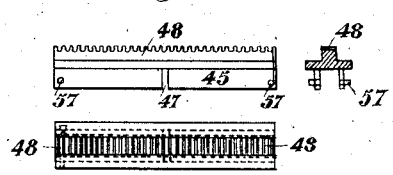
WITNESSES:
W. M. Avery
A. H. Davis
INVENTOR
Roberto Taeggi Piscicelli
BY
Munn
ATTORNEYS No. 814,985. PATENTED MAR. 13, 1906.
R. T. PISCICELLI.
MACHINE FOR PRINTING AND ISSUING RAILWAY TICKETS.
APPLICATION FILED JULY 6, 1903.

12 SHEETS—SHEET 6.

WITNESSES
H. M. Avery
A. H. Davis

INVENTOR
Roberto Taeggi Piscicelli
BY
ATTORNEYS

No. 814,985. PATENTED MAR. 13, 1906.
R. T. PISCICELLI.
MACHINE FOR PRINTING AND ISSUING RAILWAY TICKETS.
APPLICATION FILED JULY 6, 1903.

12 SHEETS—SHEET 7.

WITNESSES:

INVENTOR
Roberto Taeggi Piscicelli
BY

ATTORNEYS

No. 814,985. PATENTED MAR. 13, 1906.
R. T. PISCICELLI.
MACHINE FOR PRINTING AND ISSUING RAILWAY TICKETS.
APPLICATION FILED JULY 6, 1903.

12 SHEETS—SHEET 8.

WITNESSES:
W. M. Avery
A. H. Davis

INVENTOR
Roberto Taeggi Piscicelli
BY
ATTORNEYS

No. 814,985. PATENTED MAR. 13, 1906.
R. T. PISCICELLI.
MACHINE FOR PRINTING AND ISSUING RAILWAY TICKETS
APPLICATION FILED JULY 6, 1903.

WITNESSES:
W. M. Avery
A. H. Davis

INVENTOR
Roberto Taeggi Piscicelli
BY
Mumm
ATTORNEYS

No. 814,985. PATENTED MAR. 13, 1906.
R. T. PISCICELLI.
MACHINE FOR PRINTING AND ISSUING RAILWAY TICKETS.
APPLICATION FILED JULY 6, 1903.

12 SHEETS—SHEET 10.

WITNESSES:

INVENTOR
Roberto Taeggi Piscicelli
BY
ATTORNEYS

No. 814,985. PATENTED MAR. 13, 1906.
R. T. PISCICELLI.
MACHINE FOR PRINTING AND ISSUING RAILWAY TICKETS.
APPLICATION FILED JULY 6, 1903.

12 SHEETS—SHEET 11.

WITNESSES
W. M. Avery
A. H. Davis

INVENTOR
Roberto Taeggi Piscicelli
BY
Munn
ATTORNEYS

No. 814,985. PATENTED MAR. 13, 1906.
R. T. PISCICELLI.
MACHINE FOR PRINTING AND ISSUING RAILWAY TICKETS.
APPLICATION FILED JULY 6, 1903.
12 SHEETS—SHEET 12.
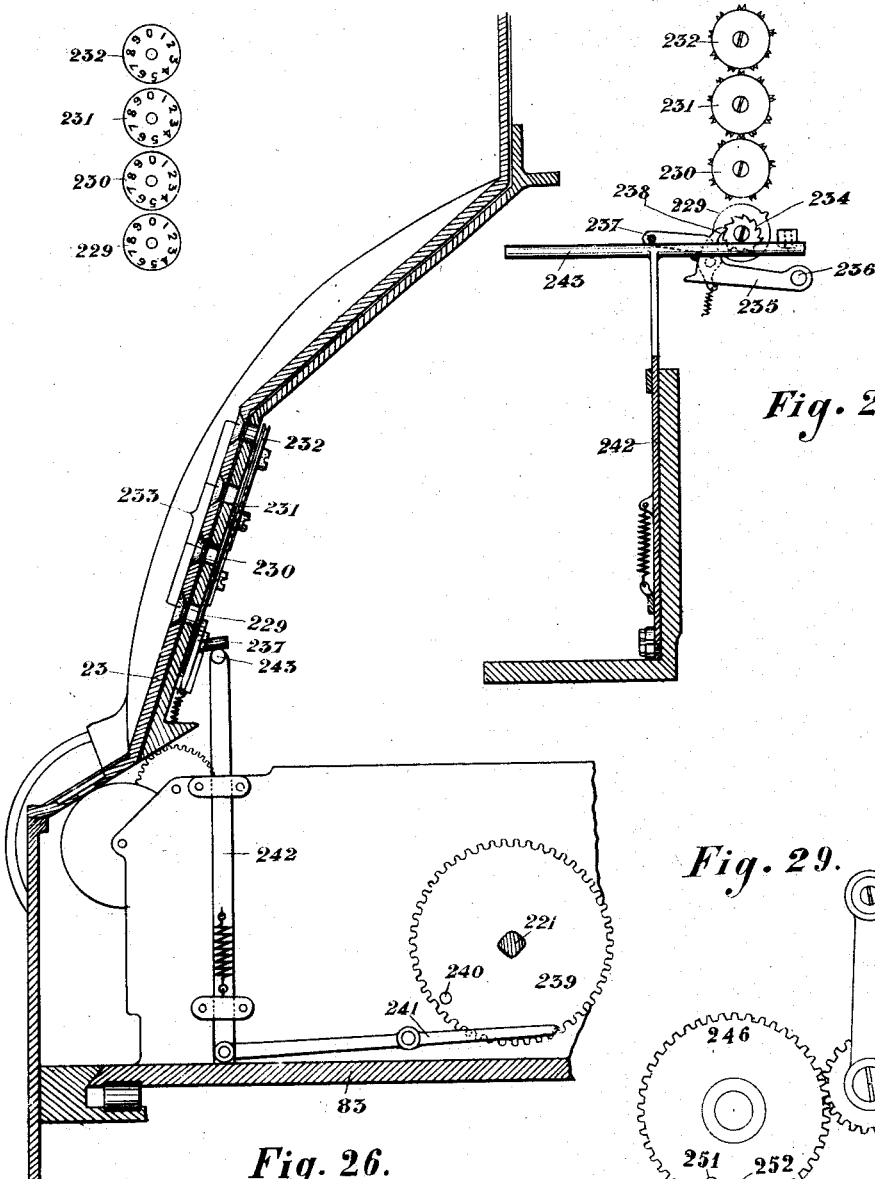
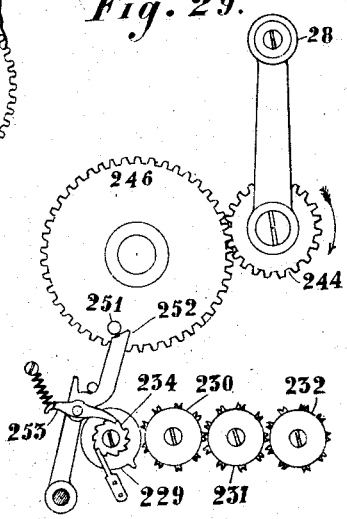
WITNESSES:
W. M. Avery
A. H. Davis
INVENTOR
Roberto Taeggi Piscicelli
BY
Munn
ATTORNEYS

UNITED STATES PATENT OFFICE.

ROBERTO TAEGGI PISCICELLI, OF NAPLES, ITALY.

MACHINE FOR PRINTING AND ISSUING RAILWAY-TICKETS.

No. 814,985.  Specification of Letters Patent.  Patented March 13, 1906.

Application filed July 6, 1903. Serial No. 164,361.

*To all whom it may concern:*

Be it known that I, ROBERTO TAEGGI PISCICELLI, engineer, a subject of the King of Italy, and a resident of Piazza della Borsa, No. 22, Naples, Italy, have invented certain new and useful Improvements in Machines for Printing and Issuing Railway-Tickets, of which the following is a full, clear, and exact description.

This invention relates to a machine for printing railway-tickets as they are required by the public. These tickets may be either for predetermined stations to which tickets are frequently required or for other stations. In the first case the composition of the matter to be printed on the tickets is previously prepared in the machine itself. In the second case the clerk composes the matter when required. The machine is provided with a continuous paper ribbon which is cut into pieces of the length of a ticket.

The machine prints, first, the name of the issuing station; second, the name of the station for which the ticket is issued; third, the date of issue; fourth, the number; fifth, the class and kind of tickets, (single or return;) sixth, the price of the ticket; seventh, the number of the train. Commercial advertisements and information as to the train service may be printed on the back of the ticket.

While issuing a ticket the machine will also perform the following operations, first, the addition of the money received; second, the addition of the number of each kind of ticket (single, return, express, or ordinary trains, &c.) issued; third, the addition of the total number of tickets issued; fourth, printing on a continuous paper ribbon a duplicate of the matter printed on each ticket.

Although the mechanism of the machine is the same for all stations, each machine must be previously prepared.

The annexed drawings show, as an example, a machine intended for a single class of tickets of the following kinds, both for predetermined and for occasional stations, first single tickets by express train; second, single tickets by ordinary train; third, return tickets by express train; fourth, return tickets by ordinary train. Many other types of the same machine may, however, be built for preparing tickets of several classes on different lines, according to the requirements of the issuing-stations.

Figure 2:
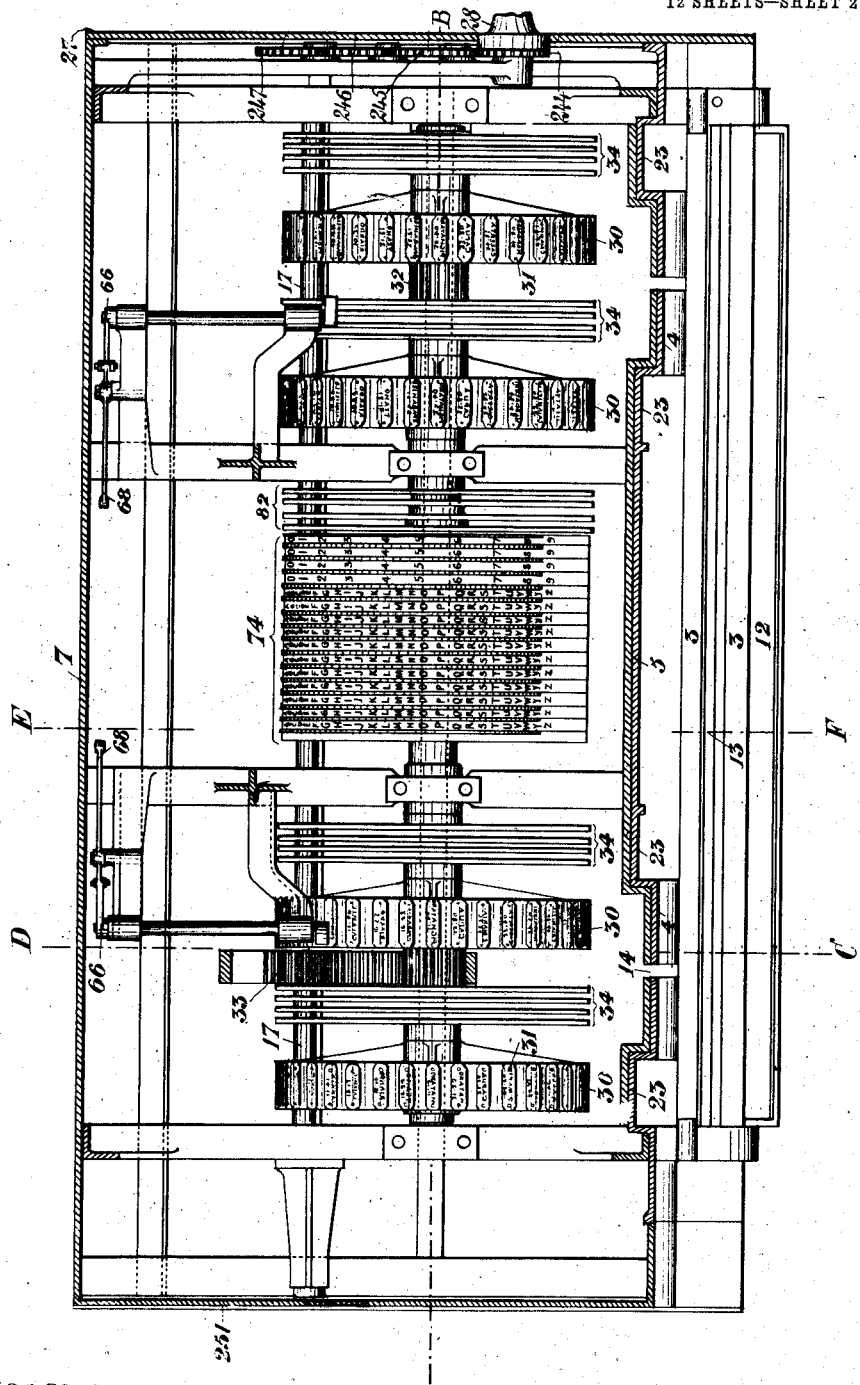
Figure 3:
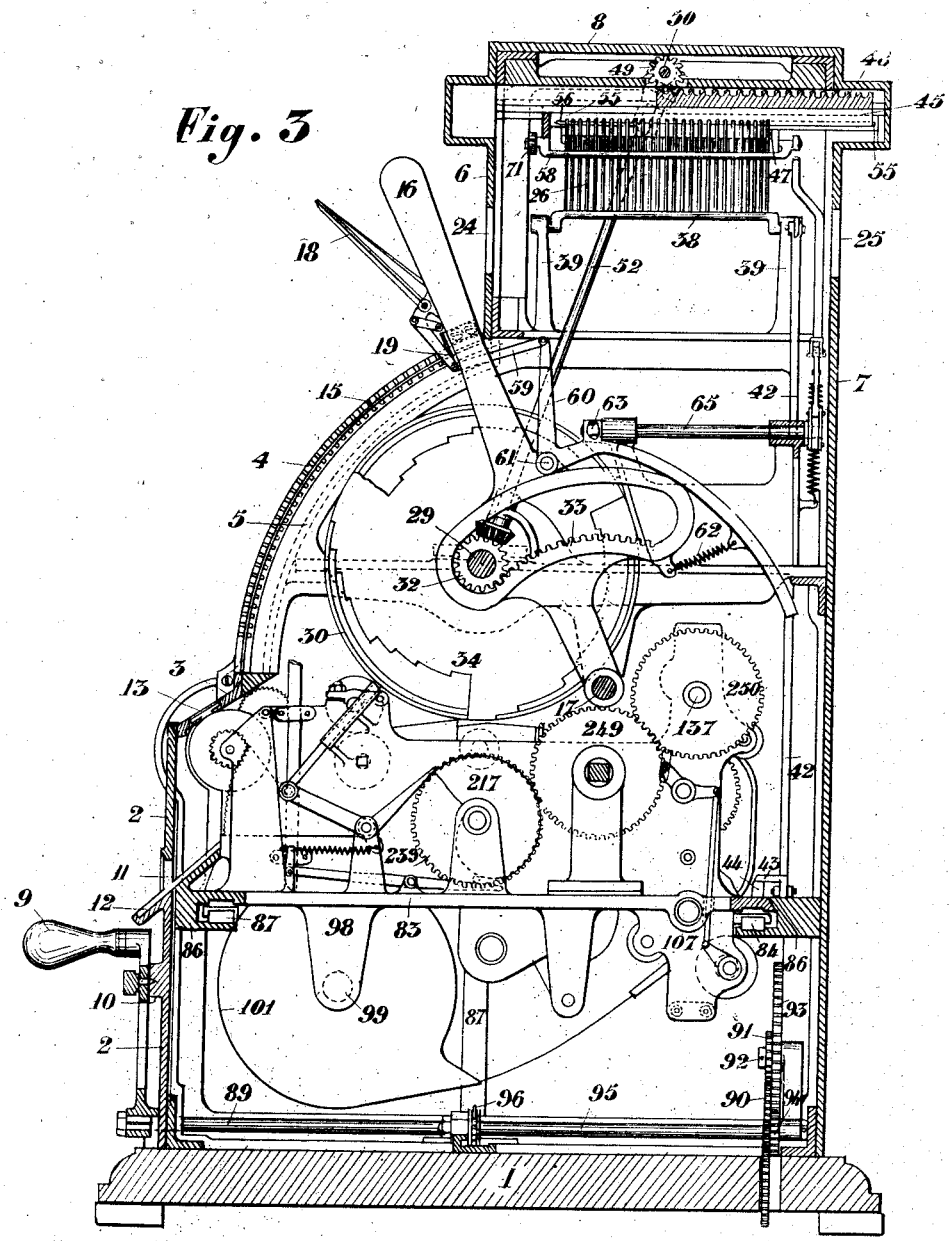
Figure 10:
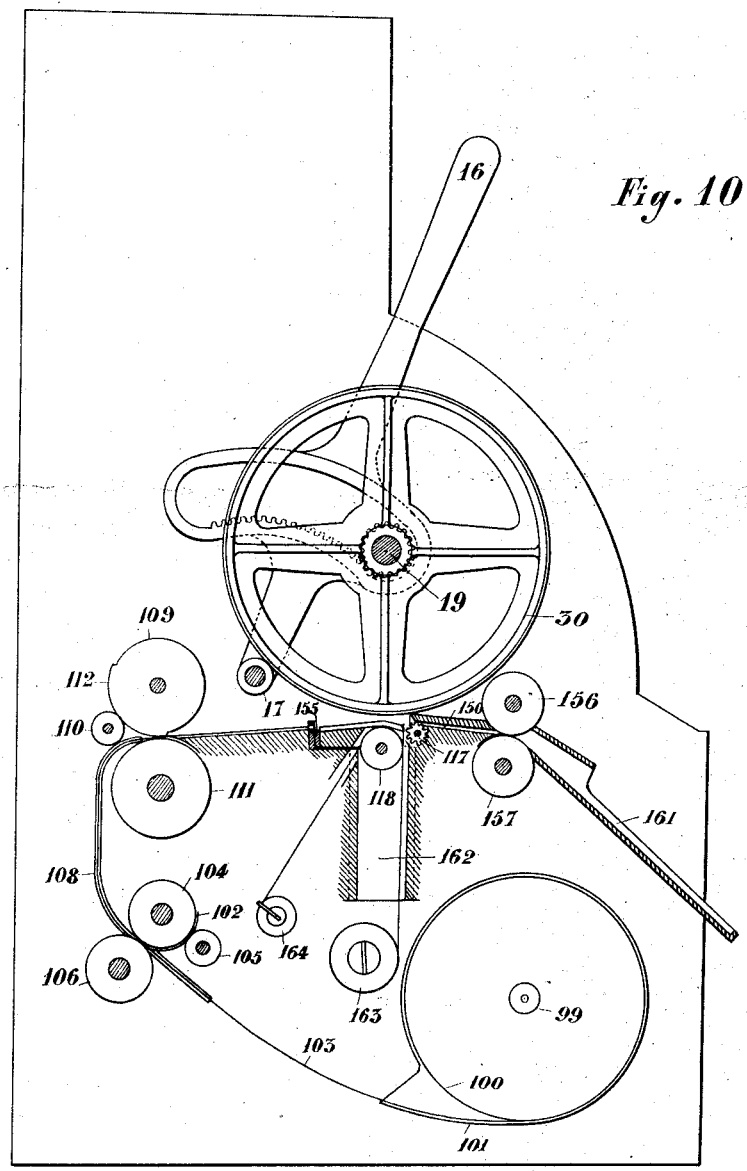
Figure 11:
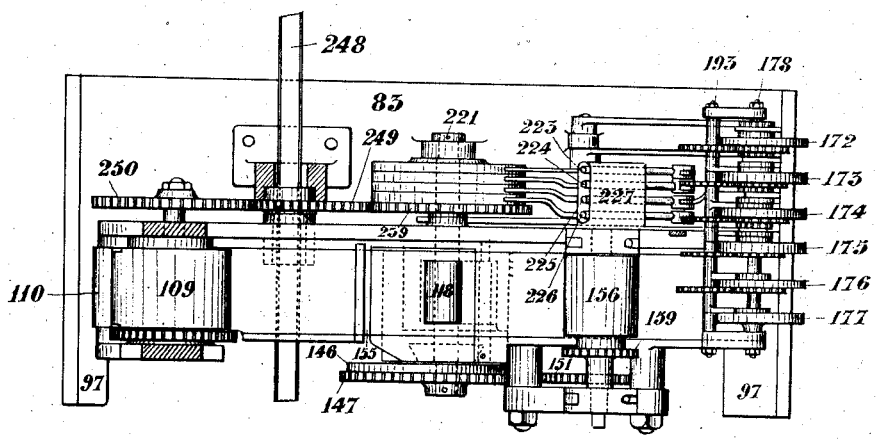
Figure 12:
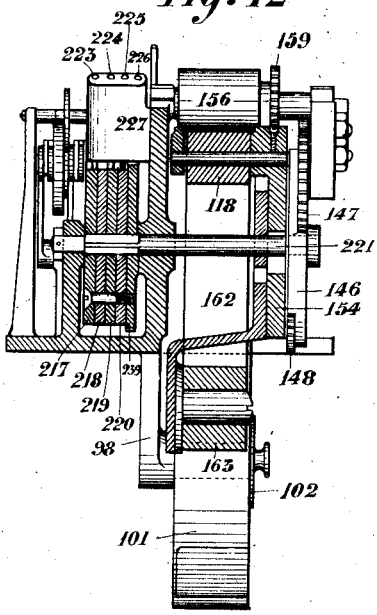
Figure 13:
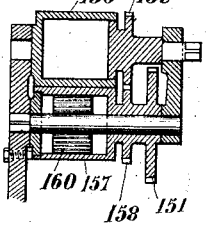
Figure 16:
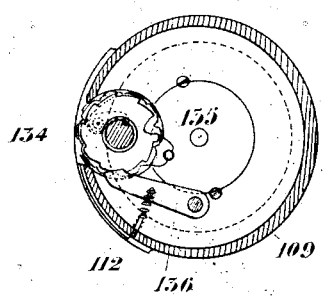
Figure 17:
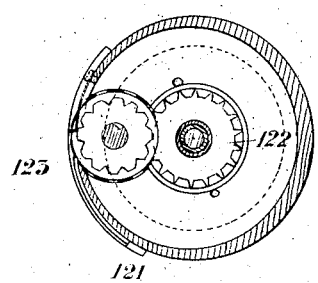
Figure 14:
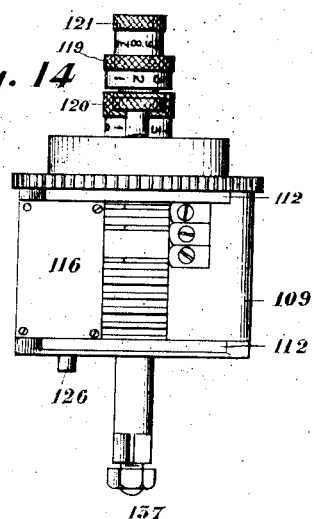
Figure 15:
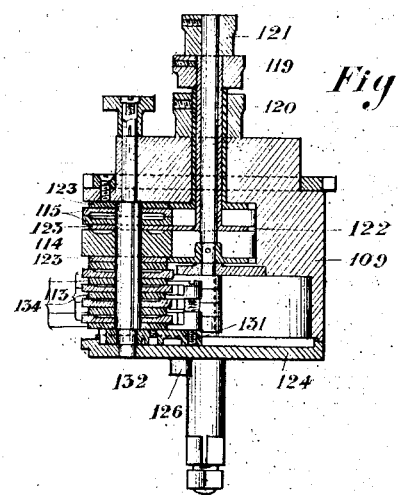
Figure 18:
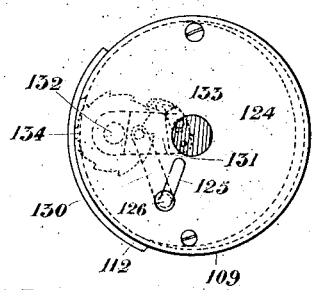
Figure 19:
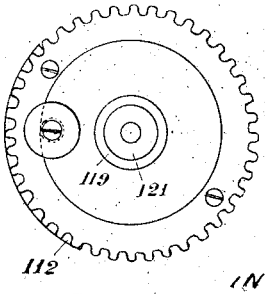
Figure 22:
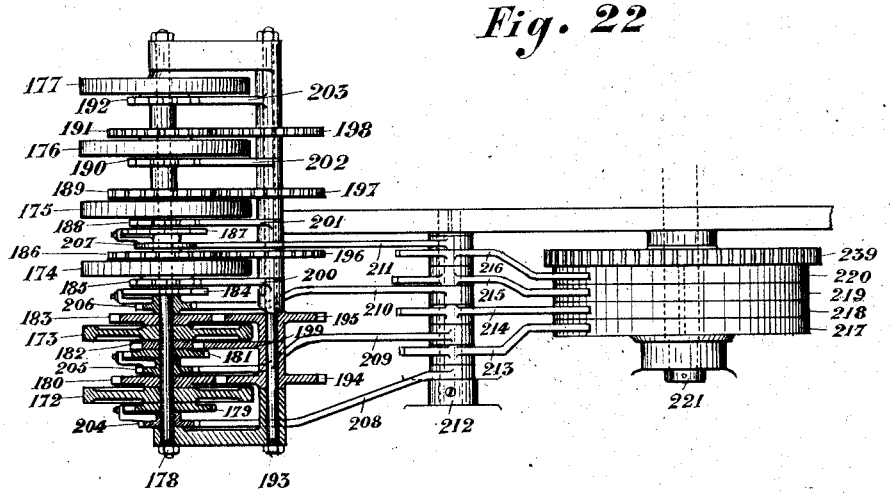
Figure 23:
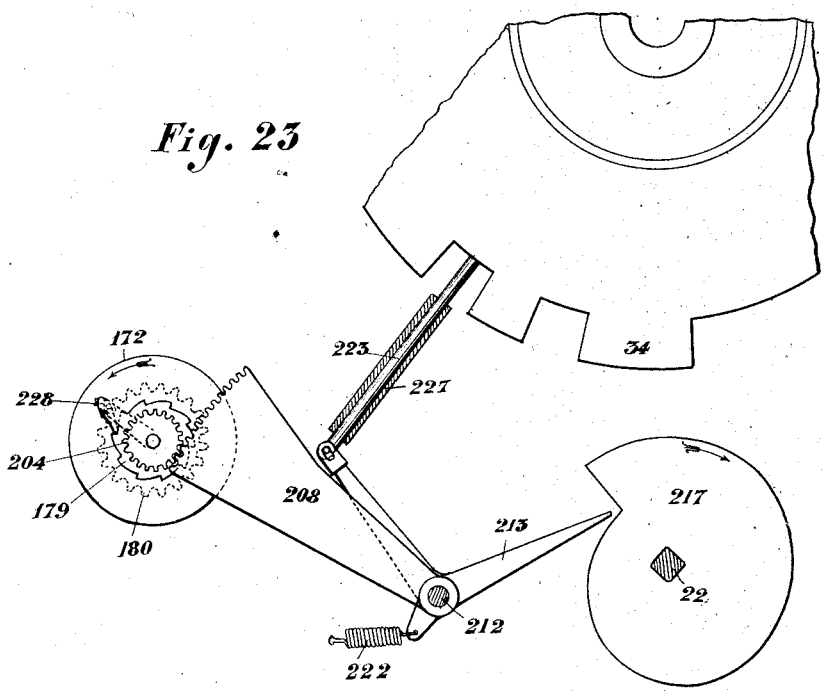
Figure 24:
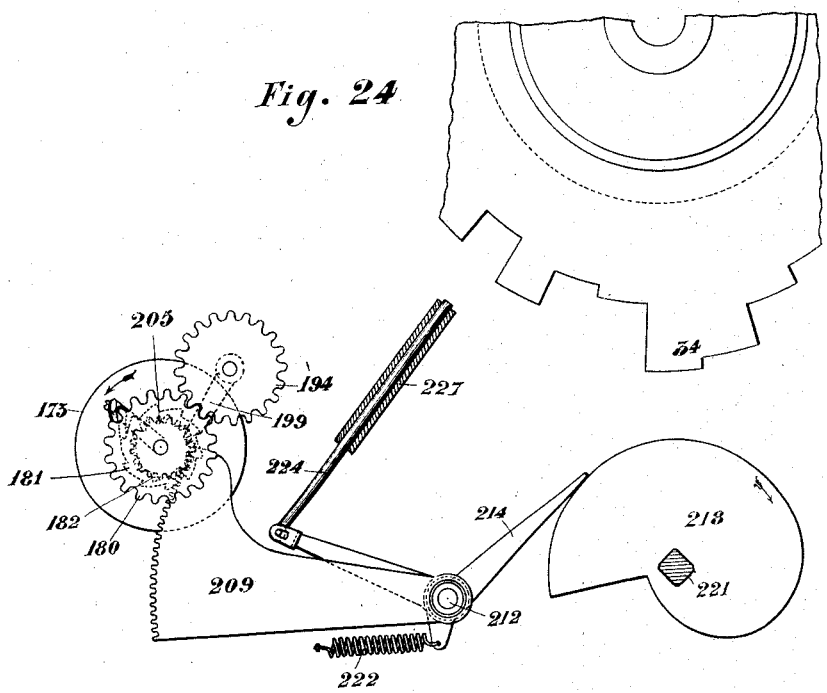
Figure 25:
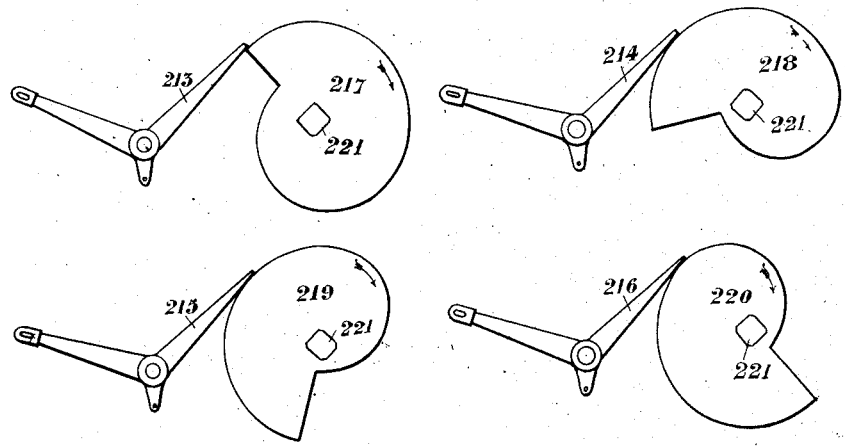

Figure 1 is an elevation of the machine, partly in section, on the line A B, Fig. 2. Fig. 2 is a plan of the machine when uncovered, parts being omitted to show more clearly the parts carried by the main shaft. Fig. 3 is a vertical transverse section on the line C D, Fig. 2. Fig. 4 is a vertical transverse section on the line E F, Fig. 2. Figs. 5, 6, 7, and 8 show the four cams annexed to a stamping-disk. Fig. 9 shows details of the guide regulating the fall of the labels. Fig. 10 is a vertical transverse section showing diagrammatically the arrangement of some of the mechanisms carried by the traversing table. Fig. 11 is a plan of the traversing table. Fig. 12 is a vertical section of the traversing table on the line G H, Fig. 11. Fig. 13 shows, in vertical section, a detail of part of the traversing table. Figs. 14 and 15 are respectively an elevation and section of the roller with the ticket-numberer. Figs. 16, 17, 18, and 19 show details of this roller. Figs. 20 and 21 are a part side elevation and an end elevation, to a larger scale, of the traversing table, showing the stamping-rollers and the gear for putting out of action the numberer and the disk for printing on the back of the tickets. Fig. 22 is a plan of the mechanism for the addition of the prices, parts being in horizontal section. Figs. 23 and 24 show, in elevation to a large scale, successive positions of the mechanism for the addition of the prices. Fig. 25 shows the setting of the four regulating-cams actuating this mechanism. Figs. 26, 27, and 28 show different views of a numerator for each kind of ticket with the gear for driving it, and Fig. 29 shows the arrangement of the general numerator and the gear for driving it.

1 is the base-plate. (See Figs. 1, 2, 3, and 4.) The front of the casing consists of a vertical plate 2, an incline 3, a cylindrical part 4, having at its middle a reëntering part 5, and a vertical plate 6. The opposite side consists of a vertical plate 7, the top of which is connected to 6 by means of a horizontal cover 8. In front of the employee is a handle 9, free to turn on a semicircular guide 10, on which the names of the various kinds of tickets are engraved. Above the handle is a narrow opening 11, having an inclined bottom 12, through which the tickets are delivered. On the incline 3 there is a long opening 13, covered with a glass, through which the sums of money received may be read. On the curved surface of the drum 4 there are two narrow openings 14, Fig. 2, in each of which works a lever 16, pivoted on the shaft 17. Each of these levers is fitted on its upper part with a locking-handle 18, which causes a bolt 19 to enter one of the notches 15 in the side of the opening 14. The tickets for the predetermined stations are printed at the two sides of the machine and those for occasional stations in the middle. When a ticket is required for one of the predetermined stations, the operation consists in seizing the lever 16 and handle 18, thereby freeing the bolt 19 from the notch 15, and then turning the lever 16 until it reaches the notch corresponding to the station for which the ticket is required. This position of the lever being reached, the handle 18 is released and the lever 16 is locked. The movement of lever 16 causes one of the stamping-disks placed inside the machine to take the position for printing the ticket required, and a set of cams connected with this disk will also turn and control the movement of the apparatus, summing up the money received. The movement of the lever 16 will simultaneously cause the lowering of one of the labels 26, which will appear between the two openings 24 and 25, and shows on both its faces the name of the station and the kind and price of the ticket. In this way both the traveler and the employee will be able to see that the ticket about to be printed is the required one, and they will learn the price before it is issued. In the second case—that is, when a ticket for an occasional station is required—the operation necessary to make the machine ready to print the ticket consists in turning a certain number of the wheels 20 in order to compose the name of the station and the price, which will be read through the openings 21. It is evident that in this case the price must be previously known by the employee. This movement of the wheels 20 will cause an equal number of stamping-disks to be put ready for printing the ticket required, and simultaneously the cams regulating the apparatus for summing up the money received will turn. In the meanwhile the name of the station and the price will also appear at the openings 22 and be read by the purchaser, and he will pay the amount before the ticket is issued. The operation of printing the ticket, either for predetermined or occasional stations, consists in giving the handle 28, projecting from the right-hand side of the machine, two revolutions, and soon afterward the ticket will come out of the opening 11 and rest on the inclined plate 12. While this is going on the following operations are performed: (a) On a paper ribbon placed inside the machine is printed the duplicate of the matter printed by the disks on the ticket. (b) The numerator corresponding to the kind of ticket is increased by unity. (c) The summing apparatus adds the price of the ticket to the former total and shows the new total at the opening 13. (d) The numerator placed near the handle 28 will also increase by unity.

The apparatus for printing the tickets for predetermined stations consists of a disk 30, turning loose on a shaft 29. On the edge of this disk a certain number of small plates 31, only few of which are shown on the drawings, in order to avoid confusion, are fixed, and on each of these there is in relief the name of one of the stations of the line and the class and price of the ticket to it. The disk is fixed to a pinion 32, working with a toothed sector 33, which forms part of the lever 16. The sector 33 is of such a length that as the lever 16 describes an arc of ninety degrees the pinion 32 and disk 30 will complete one revolution. The small plates 31 are so placed on the stamping-disk 30 that they are at the lowest point of the disk when the lever is in the notch corresponding to the station whose name is on the plate. In revolving the disk 30 touches one of the inking-rollers arranged on the shaft 17, which inks the projecting types of the plates 31 and makes them ready to print their indications upon the tickets. Each disk 30 is connected to a set of four cams 34, and these are so shaped as to suitably actuate the summing apparatus according to the price of each ticket. Each cam 34 consists of a disk from which portions are cut. Those shown at Figs. 5, 6, 7, 8 are designed for francs and centimes; but they may readily be modified for pounds, shillings, and pence. Assume that on the primitive disk nine concentrical and equidistant circles are traced in order to typify, respectively, the ten numbers from "0" to "9"—namely, the edge will represent "0," the first internal circle will represent "1," the second circle "2," and so on. Now let the periphery be divided into as many equal parts as the number of plates fixed on the corresponding stamping-disk and, lastly, let the center be joined with all the divisional points of the periphery, and then it is evident that so doing each sector of the cam included by two radii will correspond to one of the plates fixed on the stamping-disk. Now in order that each of these sectors be of a different value it will be sufficient to cut away a portion limited by two radii and one of the internal circles, which, as stated, are presumed to represent different values. If the price of a ticket be not greater than ninety-nine francs ninety-nine centimes, a set of four cams will be sufficient. The first cam (see Fig. 8) will then be intended for tens of francs; the second cam, Fig. 7, for the units of francs; the third cam, (see Fig. 6,) for the tens of centimes; the fourth cam, Fig. 5, for the units of centimes. Every sector of the four cams corresponding to a given small plate of the stamping-disk should be cut in such a manner that the depths of their gaps may respectively determine the numerical signs of which each price is composed. Let, for instance, nineteen francs seventy-five centimes be the price of a ticket, and then the first cam should be cut up to the first internal circle, the second cam up to the ninth circle, the third cam up to the seventh circle, and the fourth cam up to the fifth circle. In the machine shown by the drawings instead of one starting-lever for each stamping-disk and set of cams there is a single lever for every two disks and respective two sets of cams—viz., one lever on the left hand for working two stamping-disks for single tickets on express or ordinary trains, respectively, and another lever on the right hand for the other two stamping-disks for return-tickets on express or ordinary trains, respectively. Each set of four cams is placed at the right hand of the stamping-disk, and thus there are two disks and two sets of cams connected with a central pinion 32 loose on the shaft 29. Although by moving one lever two stamping-disks with their cams will be turned, yet only one of same disks will really print a ticket—namely, that under which the traversing table with its paper-roll will have been carried. The summing apparatus will then correspond, as it will be seen, to the set of cams connected with this disk, and thus it will add to the total the price of the required ticket.

Each stamping-disk 30 works in connection with a set of labels 26, which are as many in number as the stations on the line except the one of departure. Each label, Fig. 1, is made of a thin rectangular plate having a tail 35 ending in a tooth 36. The tails of the labels are pivoted on a fixed shaft 37. The labels are kept upward by a cranked arm 38, free to turn in bearings 39, projecting from the side frame of the machine. One end of this arm is formed of a lever 40, one arm of which is connected to a spring 41, and the other end is pivoted to a vertical rod 42, the lower end of which is joined to another lever 43. When the traversing table is carried underneath the stamping-disk for printing a ticket of a given kind, an arch-shaped piece 44 (projecting out of the traversing table) on passing under lever 43 causes one end of it to rise and the other to fall, drawing down the rod 42, and this by acting on the lever 40 lowers the arm 38, supporting the tails of the labels, and thereby the latter will be left free to fall down. Only one of these labels will, however, fall—namely, the one bearing the name of the station corresponding to the notch at which the starting-lever has been stopped. For this purpose there is a slide 45, Fig. 9, moving horizontally in a guide 46. This guide has two ribs between which the teeth of the labels engage. On the middle of these ribs there is a vertical notch 47, permitting but one tooth 36 to pass through, and thereby only one label to lower. The slide 45 is operated by one of the two stamping-disks. The stamping-disk has fixed to it a bevel-wheel 54, which by means of the pinion 53, vertical shaft 52, and bevel-gearing 51 transmits the movement to the shaft 50, on the end of which is keyed the spur-wheel 49, gearing with teeth 48 on the top of the slide 45. It is evident from what has been said that the traverse of the starting-lever 16 and thereby the notch 47 of the slide will reach the label bearing the name of the station where the starting-lever has been stopped. To reduce the length of slide 45, two sliding pieces 55, (see Fig. 9,) are added to the ends of slide 45, and each piece has a groove 56, wherein a pin 57, fixed to the slide 45, runs. Owing to this arrangement, when the slide 45 is at the end of its travel one of the added pieces will act as a guide for the labels. When the slide comes back, its pins will run in the grooves, and on the slide going farther it will drive the pieces until its stroke is accomplished. In order to again raise the lowered label 26, the shaft 37 of each set of labels is connected with a piece 58, consisting of a small rod bent like a U and mounted loose on the shaft 37. These pieces act as follows: The lower end of handle 18 on the starting-lever 16 is connected by links 59 with a bell-crank lever 60, which turns on a spindle 61 on the starting-lever 16. One arm of the bell-crank lever 60 is arched, and its end is connected, by means of a spring 62, to the lever 16. When the handle 18 is pressed against the lever 16, the arched arm of the lever 60 rises, becoming concentric with the shaft 17, around which the starting-lever turns, and a small roller 63 on its back will also be compelled to rise, reaching the same level whatever be the position of lever 16. This movement of the roller is transmitted through connections 64, 65, 66, 67, 68, 69, 70 to one of the pieces 58, which will be compelled to describe a fourth of a revolution and raise the lowered label and the other labels of both sets clear of the ribs of the slide 45.

Every ticket for an occasional station is printed by means of a composer worked by hand. This composer consists of wheels 20, (see Fig. 4,) mounted on the same horizontal shaft in front of the machine. Beside each wheel is fixed a toothed rim 72, gearing with a pinion 73, and thus actuating one of the disks 74. Four of these disks have on their edges the numerical signs "0" to "9" and are intended for composing the prices of the tickets. The other disks have on them the alphabetical letters for composing the names of stations. The disks 74 also have repeated on another portion of their edges the same numbers or letters which they show through an opening 21 underneath the wheels 20, so that while on the lower parts of the disks will be ranged the numbers and letters composing a stamping indication a similar indication will appear at the opening 21. In order that same indications may be also read by the public, there is another set of disks 77, whose indications are read through the opening 22. If each disk 74 were geared with a corresponding one 77 in the same vertical plane, the name of the station and the price would appear reversed at the opening 22. To avoid this inconvenience, the following arrangement is adopted: The first disk 77 (see Fig. 1) on the left hand gears with a pinion which in its turn gears with the last disk 74 on the right hand. The second disk 77 on the left gears with a pinion 78, keyed on a sleeve loosely carrying at its end another pinion similar to 78, gearing with the last disk 74 but one, and so on. Half of the disks 77 may be geared with half of disks 74 through a second counter-shaft and sleeves 80. (See Fig. 4.) Every set of four disks 75 for composing the price of tickets in fitted with four cams 82, similar to the cams 34, already described, which actuate the price-summing-up apparatus. The cams 34 differ, however, from 82, inasmuch as the former are moved all together, whereas the latter are moved independently one from another. In other words, each disk 75 will actuate only one of the cams 82. As the latter also are placed on the same shaft as the disks, they are carried by sleeves, so as to render independent the movement of each cam.

The paper ribbon from which the tickets are cut and also the mechanisms for stamping, cutting, and defacing tickets, for making the duplicates, and summing up the prices are all carried by a traversing table. The various mechanisms are so arranged on the traversing table that when the paper-roll is under a given stamping-disk the summing-up apparatus will add its price. There is also another mechanism on the traversing table which in every position of the latter will correspond with one of the numerators, placed, as stated, on side 23 and intended for summing up the number of each kind of ticket issued, and this mechanism will displace by unity the numerator at the same time a ticket is printed. The traversing table consists of a frame 83, (see Fig. 1,) mounted on four traveling wheels 84, connected in pairs by bars 85. The wheels run on longitudinal bars 86, fixed, respectively, on the front 2 and back 7 of the machine. At the ends of the frame 83 are fixed the ends of a steel ribbon 87, running on four small pulleys 88, two of which are at a higher level than the other two. The movement of the traversing table is obtained by means of the handle 9, whose spindle 89 carries at its other end a toothed wheel 90. This wheel gears with a pinion 91, keyed on the shaft 92 of another toothed wheel 93, which in its turn gears with a second pinion 94, keyed on a second shaft 95, which bears on its other end a pin-wheel 96, which engages with a series of equidistant holes in the steel ribbon 87. In plan the frame 83 (see Fig. 11) of the traversing table is a rectangle, having toward its ends two parts 97, projecting from one of its longer sides. In elevation it has several brackets, one of which, 98, (see Figs. 3 and 4,) is vertical and carries at its end a horizontal pin 99, on which a paper-roll 100 is mounted. This paper-roll is protected by a casing 101, fixed on the pin 99 by means of a plate 102. The paper ribbon 103 (see Fig. 10) on its unrolling from the roll 100 will pass at first between two cylinders 104 and 106, carried by a bracket 107. The upper cylinder 104 is inked by a small roller 105 and will print on the back of tickets the number of the starting train and commercial advertisements or information as to the train-service. After having passed between these two cylinders the paper ribbon 103 runs along a hollow rectangular guide 108 toward two other cylinders, the upper of which, 109, is inked by a second inking-roller 110 and prints on the right of the paper ribbon the progressive number, the date, and the name of the issuing station. The printing-cylinders 104 and 109 have on their edges two projecting ribs 112, the developed length of each being equal to the length of a ticket, and as these ribs are respectively in contact with the pressing-cylinders 106 and 111 they will compel the paper to go forward the length of a ticket, and it will then remain slack, resting on the lower cylinders 106 and 111. During the time the paper is being driven forward the upper cylinder 109 will print on it the above-mentioned indications. The cylinder 109 (see Figs. 13, 14, 15, 16, 17, 18) is hollow, and it has in it seven small disks, which project through an opening in its curved surface as far as the top of the ribs 112. Four of these disks 113 print the progressive numbers of the tickets from "1" up to "9999." A wider disk 114 prints the month, and two disks 115 print the days from "1" up to "31." The year and the name of the issuing station is printed after the date and by means of a little plate 116, fixed on the surface of the cylinder 109 in the space between the two ribs 112. On the cylinder 109 (see Fig. 10) continuing to turn round the paper being slackened will not go farther until the cylinder has described an arc of two hundred and forty degrees, and thus accomplished an entire revolution, when the ribs of the cylinder 109 will again come into contact with the pressing-cylinder 111, and then another ticket will be printed on it, and so on. After three revolutions of the upper cylinder 109—that is, when the paper ribbon has progressed the length of three tickets—its end reaches a small roller 117, which presses it against an upper guide. The paper will thus have taken its position under one of the stamping-disks 30, which prints on it the name of the station of arrival, the class and the price, as will be seen a little later. The day-printing disks are moved by hand every morning by means of two wheels 119 and 120, (see Figs. 14 and 15,) and the month-disk is similarly moved by hand every month by means of a third wheel 121. These three wheels are fixed on three concentric shafts carrying three toothed wheels 122, gearing with pinions 123, each fixed to one of the printing-disks. The small disks for printing the progressive number are moved automatically by means of the gear hereinafter described.

In the cover 124 (see Fig. 18) of the cylinder 109 is a slot 125, forming a guide for a pin 126, the end of which runs in a ring 128, (see Fig. 21,) pivoted to the vertical side 107 of the traversing table by means of a pin 129, round which it may describe a certain arc. The other end of pin 126 is fixed to an arm 130, which is pivoted to the middle of a lever 131, movable on the shaft 132 of the disks 113 and bearing on its free end a set of four pawls 133. These four pawls are of a decreasing length from the first to the last, and they engage, respectively, with the teeth of four ratchet-wheels 134, each of which is fixed to one of the printing-disks 113. Each ratchet-wheel has ten teeth and after the tenth one a deeper tooth 135, wherein one of the pawls 133 can lie. On the opposite side of the ratchet-wheels 134 there are four retaining-pawls 136, acted on by springs which prevent the wheels 134 from turning in the opposite direction. Since the groove 127 in the ring 128 is eccentric to the shaft 137 of the cylinder, as the latter revolves the pin 126 is displaced along the slot 125 and causes the arm 130 and the lever 131, carrying the four pawls 133, to rock. Normally only the first pawl is engaging with the teeth of its wheel, (the unit-wheel,) which alone, therefore, will be actuated; but when the disk of units has been moved ten teeth its pawl will reach the deeper tooth 135, whereupon the pawls will drop, bringing the second pawl into gear with the second (or tens) ratchet-wheel, which is then moved a tooth. Similarly when the first and second pawls are both in the deep teeth the third (or hundreds) ratchet-wheel is moved a tooth, and so on.

Gear is provided for putting out of action the cylinders 104 and 109, (see Figs. 20 and 21,) which must be done if it be desired to actuate the machine without printing tickets and without displacing the progressive number. For this purpose the two cylinders 111 and 106 are loose on the shafts 138 and 139, and these bear on their ends two eccentric-pins supported by the side of the carriage 107. On the pivot there is a button 140, by revolving which the roller 111 is, owing to the eccentricity of the axle, moved farther from and put out of gear with the roller 109. As the axles 138 and 139 are connected by the link 141, when the roller 111 is moved from the roller 109 the roller 106 is similarly moved away from the roller 104. When this is done, it is also necessary to stop the automatic movement of the four disks 113, which bear the figures of the progressive numbers, because the movement of the roller 111 away from the roller 109, while making it impossible for the mechanism to stamp, will not prevent the movement of the disks 113. In fact, should the handle 28 be turned the roller 109 in revolving would displace the set of printing-disks 113, although these would not be able to stamp the numbers on the paper. To avoid this inconvenience, there is a contrivance by which the movement of the roller 111 away from the roller 109 displaces the ring 128 and so makes the groove 127 concentric with the axle 137. In this way, although the pin 126 causes the roller 109 to revolve, it will cause no displacement of the lever 131, pawls 133, wheels 134, or disks 113. To give the necessary movement to the ring 128 to make the groove 127 concentric with instead of eccentric to the axle 137, there is a lever 142, pivoted at 143, whose upper end is forked to engage with the pin 144 on the periphery of the ring 128. When the button 140 is moved, an arm 145 on the end of the axle 138 moves the lever 142 around the point 143, which causes the ring 128 to revolve around the pin 129.

The paper ribbon after having left the two cylinders which printed on it the progressive number, date, and name of the issuing station runs forward and comes under either one or other of the stamping-disks 30 (see Fig. 1) or the set of types 74. At this time another mechanism comes into action which is intended to cut a ticket to a given size and press the paper against the stamping-disk. This mechanism consists of a disk 146, Figs. 4 and 12, on the edge of which there are two sets of teeth 147 and 148 in two different planes. The teeth 148 can be put in gear with a pinion 149 on the shaft of the small roller 117 for pressing the end of the paper ribbon against the upper guide 150 (see Fig. 10) and causing the ribbon to move forward. The second set of teeth 147 can be put in gear with a wheel 151, hereinafter described. On the side of the disk 146 (see Fig. 4) there is a cam-groove 152, in which a pin 153, fixed on a block 154, moves. This block runs in guides and carries on its upper part an arm for guiding the paper and supporting a small roller 118, covered with india-rubber, which forces the paper against the stamping-disk. A knife acting like a blade of a pair of shears is also fixed on the block. As the disk 146 revolves then owing to the special shape of the groove 152 the pin 193 moves the block twice upward and downward while the disk 146 makes one revolution. During the first stroke of the block the india-rubber roller 118, by pushing up the paper, (which is resting either under a stamping-disk 30 or the set of types 74,) causes the printing on the paper and at the same time the knife 155 will act and cut off a ticket. Soon afterward the set of teeth 148 will come into gear with the pinion 149, causing the roller 117 to revolve, which will compel the ticket which has just been cut off to move forward and pass through the guide 150 to other mechanisms for defacing it and stamping on it the cipher of the railway company. This mechanism consists of two cylinders 156 and 157, Fig. 4, placed one above the other. On the curved surface of the upper cylinder 156 is the name of the railway company. The lower cylinder 157 revolves on the same shaft as the toothed wheel 151, and this wheel, as above stated, is driven by the teeth 147 of disk 146. On the shaft of the wheel 151 a second toothed wheel 158, Fig. 13, is keyed, which drives a similar wheel 159 on the shaft of the upper cylinder 156. The lower cylinder 157 is hollow and within it there is a spiral spring 160, which winds up when the cylinder turns to propel a ticket forward, and therefore the spring will always tend to return the cylinder to its former position. The arc described by the cylinder must be long enough to permit a ticket moving forward its own length. At the moment the ticket leaves the two cylinders the teeth 147 of the disk 146 come out of gear and the wheel 151 is left free, whereupon the spring 160 drives the system of cylinders and wheels back to their former position, so that the printing will always be at the same place of each ticket. As the block 154 rises a second time, either a stamping-disk 30 or the set of types 74 will act again, and print the same indications upon a paper ribbon 162, Figs. 4 and 10, which unwinding from a roll 163 and winding on a roll 164 runs over the india-rubber roller 118. A duplicate of the indications of the ticket is thus obtained, giving a record of all the tickets printed by the machine. The paper-roll 163 is supported on a pin projecting from a bracket fastened to the lower part of the block 154. At the end of this bracket there is another pin 165, on which a toothed wheel 166 is mounted, so that when the block 154 rises it carries the gear with it. Loose on the pin 165 there is a lever 167, pivoted to arm 168, which is in its turn pivoted to a lug on the traversing table. On the rising of the gear the angle between the arms 167 and 168 increases and a pawl 170 on the end of the lever 167 rises over the teeth of wheel 166 without causing it to turn. When the block 154 comes back, it carries down the gear, the angle between the arms 167 and 168 decreases, and the pawl 170 engages with the teeth and turns the wheel 166 through a small arc, which causes the paper to wind round the roll 164. A second pawl 171 is provided to prevent the wheel from revolving while the pawl 170 is rising over the teeth.

The summing-up apparatus consists of six disks 172 to 177, Fig. 11, loose on a single horizontal shaft 178. On the edge of each disk the figures "0" up to "9" are engraved and so that numbers having four figures and two decimal places may be printed. These disks are connected with several wheels, as follows: the first disk 172 to a ratchet-wheel 179 and toothed wheel 180, the second disk 173 to a ratchet-wheel 181, a star-wheel 182, and ordinary toothed wheel 183, the third disk 174 to a ratchet-wheel 184, a star-wheel 185, and an ordinary toothed wheel 186, the fourth disk 175 to a ratchet-wheel 187, a star-wheel 188, and an ordinary wheel 189, the fifth disk 176 to a star-wheel 190 and an ordinary toothed wheel 191, the sixth disk 177 to a star-wheel 192. The ratchet-wheels 179 181 184 187 are similar to one another, and the star-wheels 182 185 188 190 192 are also similar to each other, each of them having ten teeth. The toothed wheels 180 183 186 189 191 are also similar to each other. Loose on a shaft 193, parallel to the shaft 178, other wheels 194 195 196 197 are mounted and are respectively in gear with the wheels 180 183 186 189 191. The wheel 194, Fig. 22, is mounted on a sleeve, on the other end of which is fixed an arm 199. The wheel 195 is similarly connected to an arm 200, the wheel 196 to an arm 201, the wheel 197 to an arm 202, and the wheel 198 to an arm 203. The arm 199 displaces by a tooth the star-wheel 182 each time the wheel 194 makes a revolution—that is, whenever the disk 172 and the wheel 180 make a revolution. As each of the above-mentioned star-wheels has ten teeth, it follows that every disk will be displaced by unity whenever the one placed on its right hand completes a revolution. Wheels 204 205 206 207, loose on the shaft 178, have fixed to them arms carrying pawls which are forced by a spring into gear with the teeth of the ratchet-wheels. The wheels 204 205 206 207 are respectively in gear with four toothed sectors 208 209 210 211, all loose on a shaft 212 (see Figs. 23 and 24) and respectively connect with four bell-crank levers 213 214 215 216. Each of these levers is forced by means of a spring 222 to keep one of its ends in contact with one of the four directing-cams 217 218 219 220, keyed on the shaft 221. The other end of each lever is forked to receive a pin. These pins are fixed to the rods 223 224 225 226, free to move up and down in the guide 227, fixed on the upright side of the traversing table. When the traversing table reaches its proper position for stamping tickets, each rod will correspond with one of the cams 34 or 32, and therefore on the rod coming forward it will stop at the bottom of the gap in the cam. It is evident that according as the stop of one of the rods—say 223—is in a more or less deep gap the corresponding toothed sector 208 will move more or less, and thereby the wheel 204 will turn more or less and similarly drive the wheel 179, connected with the disk 172. The whole gear is thus regulated in such a manner that the disk 172 will be displaced by as many units as the gap (wherein the rod 223 entered) has units of depth. The relative positions of the four directing-cams on the shaft 221 are shown in Figs. 12 and 25, and owing to this arrangement the cams will act against the bell-crank levers successively.

As already stated, the machine is fitted not only with a numerator of all the tickets printed placed close to the side 27 and herein termed the "sixth numerator," but it has also five other numerators—viz., four showing, respectively, the number of the four kind of tickets printed for fixed destinations and the fifth one showing the number of tickets made for variable destinations. Each of these five numerators consists of four small disks 229 230 231 232, bearing the figures "0" to "9." These disks are placed in front of the machine and so that each of them will show through four small circular openings 233 along a vertical line only one figure. On the shaft of the first disk 229 there is a ratchet-wheel 234, having ten teeth and only revolving in one way. This disk, which is the units-disk, bears on the right hand of its edge a single tooth. The second disk 230, that of tens, bears ten couples of teeth placed on the right and a single tooth on the left. The third disk 231, that of hundreds, bears a single tooth on the right and ten couples of teeth on the left. The fourth disk 232, that of thousands, bears ten couples of teeth on the right and nothing on the left. It is evident that owing to this arrangement at every revolution of the first disk 229 its only tooth will meet a couple of teeth of the second disk 230 and compel the same to move a tenth of a revolution. Similarly, at every revolution of the second disk 230 its single tooth will meet a couple of teeth of the third disk and compel this latter to move by a tenth of a revolution, and so on. On the side 23 there is a small lever 235, movable on a spindle 236, which bears on its other end a pin 237. A pawl 238 on this lever engages with the teeth of the ratchet-wheel 234. Whenever the pin 237 is pushed up, the first disk—viz., that of units—will be displaced by a unity. To conveniently push the pin 237 up for every ticket printed, the traversing table is fitted with a special gear, which comes under one or another numerator. This gear consists of a toothed wheel 239, keyed on a shaft 221 and carrying a pin 240. At every revolution of the wheel 239 the pin 240 will meet a lever 241 and cause one end of the same to lower and the other end to rise and move a block 242, which is joined to it. The other end of this block carries an arm 243, which on the block moving up vertically meets the pin 237 and puts the numerator in action. On the handle 28 there is a pinion 244, (see Fig. 1,) transmitting through two wheels 245 and 246 the movement to another wheel 247. The wheel 247 is keyed on a square shaft 248. While the handle 28 makes two revolutions the square shaft will make only one. A toothed wheel 249 (see Fig. 3) is mounted loose on the square axle 248 and gears with another wheel 239 having an equal diameter, keyed on shaft 221 of the directing-cams of the summing-up apparatus. The wheel 249 also gears with another wheel 250, placed on the opposite side, keyed on the shaft 137 of the cylinder 109, which prints on the tickets the name of the issuing station, the progressive number of tickets, and the date. The movement of the cylinder 109 is transmitted through gearing to the cylinders 111 104 106. This gearing, as shown in Fig. 21, consists of a gear-wheel $109^a$ on the cylinder 109, the gear-wheels $111^a$ and $111^b$ on the cylinder 111, the gear-wheel $107^a$ on the carriage 107, the gear-wheel $104^a$ on the cylinder 104, and the gear-wheel $106^a$ on the cylinder 106. The sixth numerator, which, as stated, gives the total number of tickets issued, is driven (see Fig. 29) by the last wheel 246, which transmits the movements of the handle 28 to the above-mentioned square shaft 248. At every revolution of the wheel 246 a pin 251, fixed on it, strikes against a small lever 252 and rocks it, thereby causing a pawl 253, connected with the latter, to move the ratchet-wheel 234 of the first numerator-disk 229 connected therewith. The movement of said first disk 229 is transmitted to the others 230 231, &c., in the same manner as in the other five numerators.

The operation of the machine is as follows: Assume that the machine being intended for the issue of first-class railway-tickets on the line Naples-Rome a traveler requires a first-class single ticket by express-train Naples-Ceprano, the cost of which is Fcs. 25,95. The clerk first rotates the handle 9 and stops it in the position corresponding to the single tickets for express-trains. Thereby the traversing table 83 is displaced and brought underneath the stamping-disk 30, which prints the single tickets for express-trains. In this position the arch-shaped piece 44 penetrates under the lever 43 and causes it to draw down the rod 42, thus lowering also the arm 38, which supports the labels 26 corresponding to the disk 30, under which the traversing table has been stopped. At the same time the arm 243, fastened on the top of the vertical rod 242, comes under the pin 237, fixed on the lever 235, which actuates the numerator corresponding to the single tickets for express-trains. The clerk seizes then the lever 16 which corresponds to the single tickets and freeing the bolt 19 from the notch 15 rotates the lever 16 until it reaches the notch beside which the name of the station for which the ticket is required (Ceprano) is printed. This position being reached, the handle 18 is released, and the lever 16 remains locked. The movement of the lever 16 by means of the toothed sector 33 and the pinion 32 is transmitted to the two stamping-disks 30 under its control, so that when the lever is locked at the lowest point of the two disks 30 are the two small plates 31, with the indications corresponding to the station of "Ceprano" ordinary and express trains. The depths of the notches in the sets of the cams 34 connected with the two printing-disks, which come against the sliding rods 224, correspond also to the value of the numerals forming the prices of the two single tickets "Naples-Ceprano" express and ordinary trains. In the meanwhile that the lever 16 rotates on the shaft 17 the slide 45, by means of the bevel-wheel 54, the pinion 53, keyed on the shaft 52, the bevel-gearing 51, and the spur-wheel 49 in gear with the rack 48, is moved horizontally until in locking the lever 16 the notches 47 will come to rest against the teeth 36 of the two labels 26 corresponding to the tickets for the station of Ceprano; but only one of said labels will fall, the other being maintained in the raised position by means of the cranked arm 38. Thus both the traveler and the clerk can take notice of the price and destination of the ticket about to be printed before the issue of same. Finally in order to print and issue the ticket the clerk gives the handle 28 two revolutions. The movement of the handle 28 is transmitted, by means of the gearing-wheels 245 246 247, to the square shaft 248 and to the toothed wheel 249, which while the handle 28 performs two revolutions completes only one full revolution. The driving-wheel 249 being in gear with the like wheels 239 250 causes them also to complete one turn. During the revolution of the wheel 239 the pin 240 depresses one end of the lever 241, thus displacing upward the rod 242, which by means of the arm 243 actuates the numerator in correspondence with the traversing table and displaces it by a unity. The wheel 250, which is in connection with the cylinders 112 111, 106 104, causes them also to rotate one full revolution, thereby pushing forward the ribbon 103 the length of one ticket, while the cylinder 104 prints on the back of the ticket the number of the train and other commercial or service informations, and the cylinder 109 prints on the right of the paper ribbon the progressive number, the date, and the name of the issuing station. At the same time the disk 146, keyed on the same shaft of the wheel 239, performs also a revolution and by means of the pin 153 running in the groove 152 obliges the block 154 to move twice upward and downward, printing on the first ascensional stroke the ticket and on the second the duplicate, the ticket having been removed after the printing by means of the roller 117, which pushes it between the defacing-cylinders 156 157, from which the ticket is ejected in its final shape. While the machine is performing the above said operations relating to the preparation and issue of the ticket the summing apparatus adds the prices of the ticket issued in the following manner: As the shaft 221 revolves, together with the wheel 239, the directing-cams 217 release successively the bell-crank levers 213, thus allowing the slide-rods 223 to advance against the cams 34 until they stop at the bottom of the gaps cut in their edges, displacing the disks of the summing apparatus by as many units as the gaps have units of depth. When a ticket for an occasional station is required, the operations remain the same, the only difference being that the name of the station and the price of the ticket shall be composed by turning the wheels 20 of the composer connected with the printing-disks 74 and the drums of the indicator 77. Of course in this case the handle 9 shall be stopped against the indication "Occasional stations," whereby the traversing table will be brought underneath the printing-disks of the composer.

I claim—

1. A machine for printing and issuing railway-tickets, comprising a set of drums fitted with type-plates printing on the tickets for predetermined stations matter previously prepared in the machine, a hand-operated type-setter printing tickets for occasional stations, means for cutting from a continuous paper ribbon the ticket in the required length and for printing thereon the necessary indications, date, progressive number, number of train, class, destination, price and cipher of the railway company, means by which said indications are rendered visible to the clerk and the traveler before the issue of the ticket, and means for recording said indications on a duplicate of the ticket, a summing apparatus which sums up the prices of the tickets, and numerators recording separately the number of each kind of tickets issued.

2. In machines for printing and issuing railway-tickets of any kind, the combination of a fixed shaft carrying a set of printing-drums fitted with plates bearing engraved the kind and price of the tickets and the names of the stations for which they are issued, and a set of type-wheels loosely mounted, certain of said type-wheels bearing engraved on their edges a double set of the alphabetical and others of said type-wheels bearing the numerical signs 0 to 9; a sliding carriage which can be brought in correspondence and operatively connected with any one of the printing-drums for printing and issuing tickets for predetermined stations, and with the set of type-wheels for printing and issuing tickets for occasional stations; means by which the printing-drums are caused to rotate and locked in the position corresponding to the station for which the ticket is required; means by which the type-wheels are rotated in order to compose the matter to be printed on the ticket, and means by which the sliding carriage is brought in its operative positions underneath the printing-drums and the type-wheels of the type-setter.

3. In machines for printing and issuing railway-tickets of any kind and for any desired station, the combination of a setting device, cams turning together with the type-wheels of the setting device printing the numerical signs, each of said cams consisting of a disk fitted with notches the depth of which is proportional to the value of the numbers engraved on the edge of the type-wheel; sliding rods, the stroke of which is determined by the depth of said notches, commanding a summing apparatus, and a traveling carriage, bearing the summing apparatus and impression-surface; which carriage can be moved under the setting device in such position that the impression-surface comes under the type-wheels of the setting device ready to coöperate with them in printing and issuing a ticket while the sliding rods of the summing apparatus come in correspondence with the cams, ready to add the price of the ticket issued.

4. In machines for printing and issuing railway-tickets for predetermined stations, the combination of printing-drums and sets of cams turning together with the printing-drums, said cams having notches proportional in depth to the value of the numerical signs of which each price to be printed is composed; sliding rods, controlling the movement of a summing apparatus, the stroke of which is determined by the depth of said notches, and a traveling carriage, bearing the summing apparatus and impression-surface, which carriage can be moved under any one of the printing-drums in such position, that the impression-surface comes under the type-plate of the printing-drum ready to coöperate with them in printing and issuing the ticket, while the sliding rods of the summing apparatus come in correspondence with the cams, ready to add the price of the ticket issued.

5. In machines for printing and issuing railway-tickets for predetermined stations, the combination with a printing-drum of a set of indicating-labels, a sliding guide controlling the fall of said labels, a rod bent like a U normally lowered, a lever controlling the printing-drum, and means for rotating said rod to elevate a fallen label when the printing-drum is rotated.

6. In machines for printing and issuing railway-tickets for predetermined stations, the combination of a set of printing-drums mounted on the same shaft, a traveling carriage with printing and adding mechanisms, means for shifting the carriage underneath any drum to print a ticket, a set of indicating-labels in correspondence with each drum, a cranked arm preventing normally the labels from lowering, a vertical rod and rocking levers connected thereto, which when the traveling carriage comes underneath the printing-drum, lowers the cranked arm thus releasing the labels of the set corresponding to the drum ready to print a ticket.

7. In machines for printing and issuing railway-tickets, the combination of a set of printing-drums and a setting device mounted on the same shaft, a traveling carriage bearing printing and summing mechanisms, a perforated ribbon fastened at both ends to said traveling carriage, a gear, a handle controlling the same and projecting from the front of the machine, and a pin-wheel actuated by said handle and engaging the holes of the said steel ribbon, said pin-wheel affording means to move said carriage in the desired position.

8. In machines for printing and issuing railway-tickets, the combination with a traveling carriage, of means for supporting a continuous ribbon for the tickets, means for supporting a continuous ribbon for the duplicates, a set of printing-cylinders, which print on the ticket-ribbon the name of the issuing station, the date of issue, the number of the train and the progressive number of the ticket, a setting device, mechanism for cutting the ticket to the desired size and pressing the paper against the printing-drum and the type-wheels of the setting device, means for actuating all said mechanisms, and means for shifting the traveling carriage underneath any one of the printing-drums and type-wheels of the setting device.

9. In machines for printing and issuing railway-tickets, the combination with the printing-drums and a setting device, of a traveling carriage, which can be brought in correspondence with any one of the printing-drums and the type-wheels of the setting device, means for supporting a roll of continuous paper ribbon whereon the tickets are printed, means for supporting a second roll of continuous paper ribbon, whereon the duplicates of the tickets are printed, mechanisms for cutting the tickets to a given size and pressing the same and the ribbon for the duplicates against the printing-drums and the said type-wheels, two printing-cylinders defacing the tickets and stamping on them the cipher of the railway company, and means by which said printing-cylinders are returned always to the same position after the issue of a ticket.

10. In machines for printing and issuing railway-tickets, the combination of printing-drums and a setting device mounted on the same shaft; a traveling carriage with mechanisms for cutting, printing and defacing the tickets and means for summing up the prices of the tickets issued, and cams connected with the printing-drums and the type-wheels of the setting device to control the summing apparatus mounted on the traveling carriage.

11. In machines for printing and issuing railway-tickets of any kind and for any station, a traveling carriage with a ticket and a duplicate ribbon, means for shifting the carriage to various operative positions for the issue of the various classes of tickets, a rocking lever on said carriage, and means for rocking the lever from the main shaft of the machine every time a ticket is issued, said lever acting, in the various operative positions of the carriage, on a sliding rod fixed to the casing of the machine and actuating the numerator corresponding to that class of tickets, which the carriage is ready to print.

12. A machine for printing and issuing railway-tickets, comprising in combination, a shaft a set of printing-drums and a setting device mounted on said shaft, the setting device comprising type-wheels with numbers and type-wheels with letters, cams connected with said last type-wheels, sets of cams connected with the printing-drums, a summing mechanism controlled by said cams, a set of indicating-labels in correspondence with each printing-drum, a set of indicating type-wheels working in connection with the type-wheels of the setting device, a traveling carriage with continuous ticket and duplicate ribbons, means for cutting the ticket, means for defacing the tickets and printing the duplicates, means for moving said carriage under any printing-drum in operative position, means for driving the mechanism of said carriage in any of its operative positions, numerators counting the total number of tickets issued and separately the number of tickets of each kind, means for regulating the position of the printing-drums, turning the type-wheels of the setting device and controlling the indicating-labels.

Signed by me, at Naples, Italy, this 5th day of June, 1903.

ROBERTO TAEGGI PISCICELLI.

Witnesses:
LETTERIO LABSCCETTA
LUIGO MORFINO.